F. J. SCOTT.
SAW.
APPLICATION FILED JAN. 27, 1917.
1,276,579.
Patented Aug. 20, 1918.
3 SHEETS—SHEET 1.
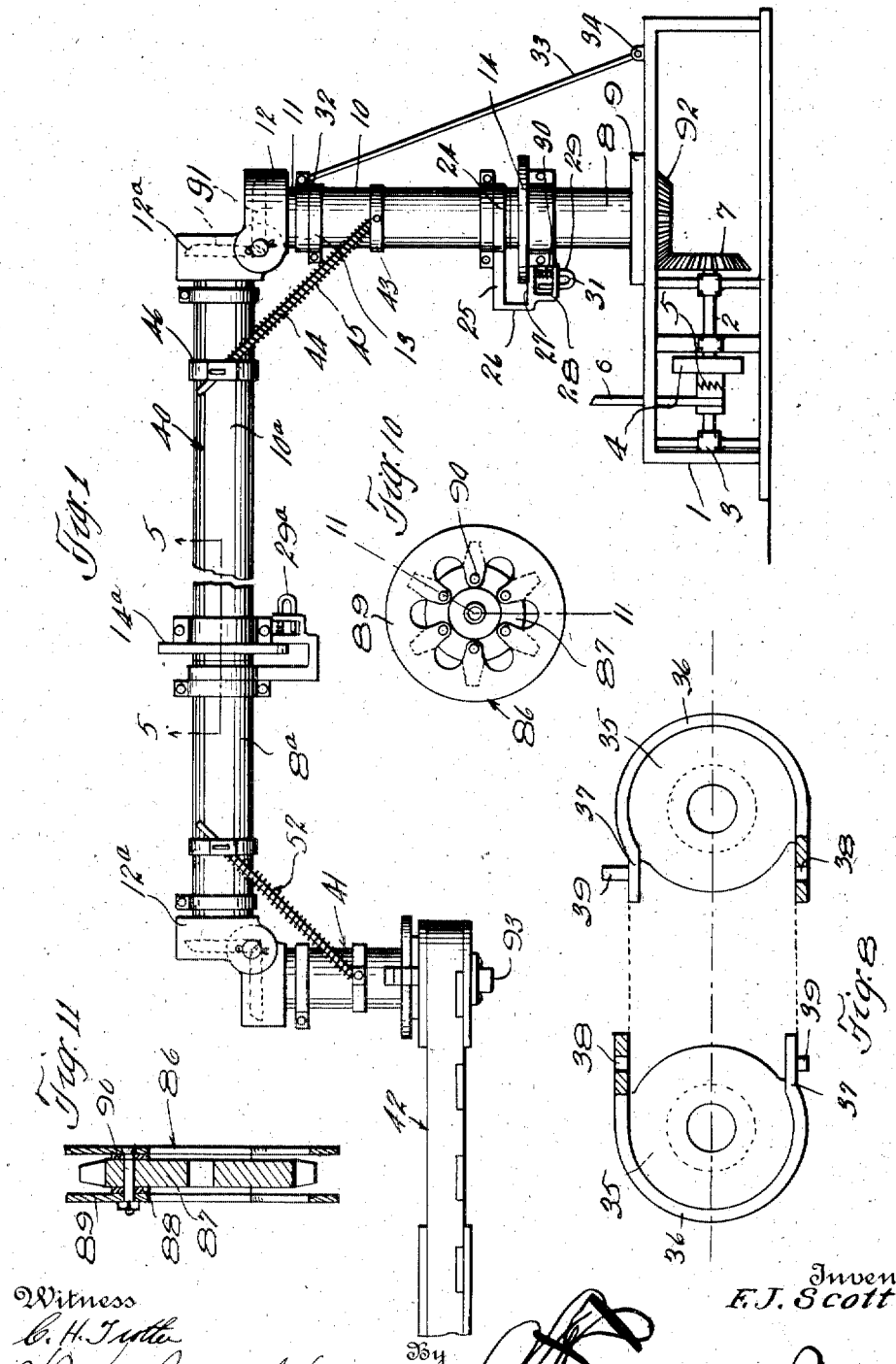
Witness
C. H. Tuttle
Inventor
F. J. Scott
By
Attorney

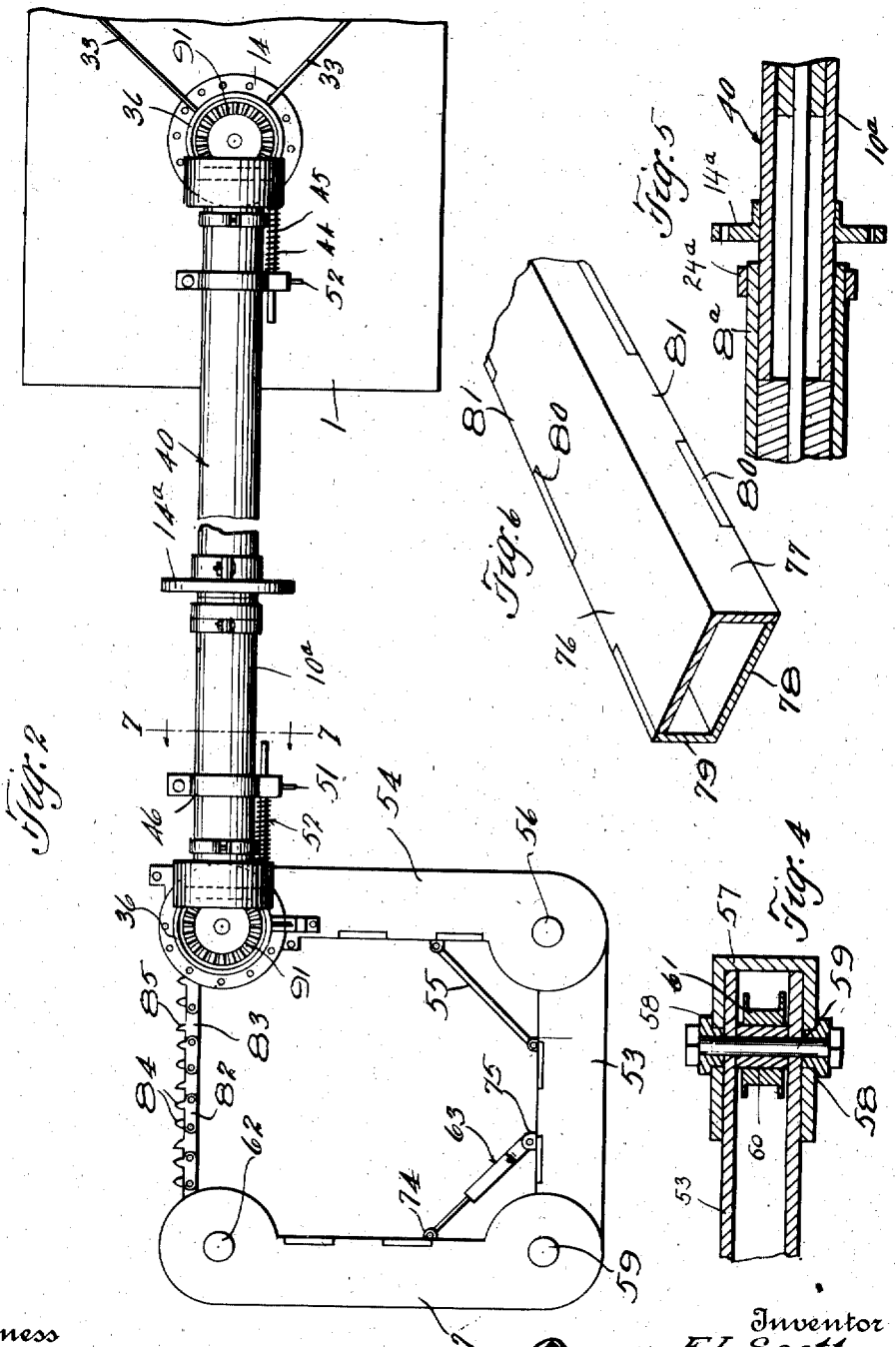

F. J. SCOTT.
SAW.
APPLICATION FILED JAN. 27, 1917.
1,276,579.
Patented Aug. 20, 1918.
3 SHEETS—SHEET 3.
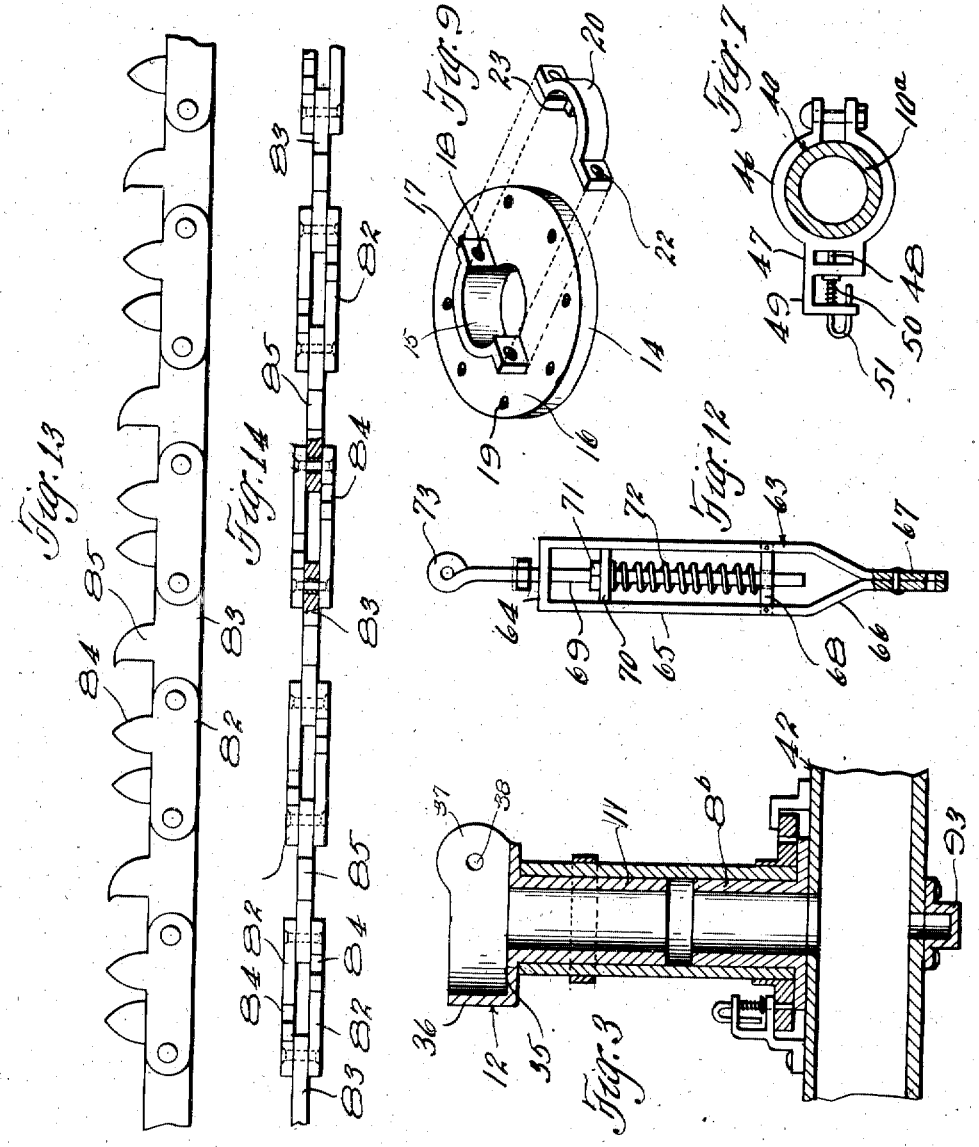
Witness
Chas. H. Trotter
H. Clay Marlatt
Inventor
F. J. Scott
By
[signature] Randolph Jr.
Attorney

UNITED STATES PATENT OFFICE.

FLETCHER J. SCOTT, OF HURDLAND, MISSOURI.

SAW.

1,276,579.  Specification of Letters Patent.  Patented Aug. 20, 1918.

Application filed January 27, 1917. Serial No. 144,925.

*To all whom it may concern:*

Be it known that I, FLETCHER J. SCOTT, a citizen of the United States, residing at Hurdland, in the county of Knox and State of Missouri, have invented certain new and useful Improvements in Saws; and I do hereby declare the following to be a full, clear, and exact description of the invention, such as will enable others skilled in the art to which it appertains to make and use the same.

This invention relates to new and useful improvements in saws and the principal object of the invention is to provide a saw which is particularly adapted for use in sawing timber and the like.

Another object of the invention is to provide a saw which may be adjusted to various positions so as to move the cutting piece into such position as to enable the saw to cut in any desired direction.

A further object of the invention is to provide a saw supported on a horizontal arm which is adjustable with relation to said arm and has counterbalancing springs which tend to counteract the weight of the saw in order that the device may be readily adjusted.

A still further object of the invention is to provide a saw consisting of a chain formed of a plurality of links provided with cutting teeth and with drag teeth, the said drag teeth being arranged to clear the groove cut by the saw of any sawdust.

A further object of the invention is to provide a novel form of driving sprocket for the chain which is constructed to avoid any possibility of the teeth clogging with sawdust.

With these and other objects in view the invention consists in the novel combination and arrangement of parts which will be fully set forth in the following specification and accompanying drawings, in which:—

Figure 1 is a side view in elevation of a saw constructed in accordance with this invention showing the base in section to more clearly illustrate the details of construction.

Fig. 2 is a top plan view of Fig. 1.

Fig. 3 is an enlarged fragmentary sectional view through a portion of the saw frame illustrating the method of connecting the same to the swiveled head which method is used throughout the entire structure.

Fig. 4 is a fragmentary sectional view through one corner of the saw frame showing the hinged joint thereof and the method of supporting the idler roller therein.

Fig. 5 is a fragmentary sectional view through the supporting arm showing the method of swivelly connecting the two parts thereof.

Fig. 6 is a fragmentary detail perspective view of a portion of the back of the saw frame showing the method of connecting the various elements.

Fig. 7 is a sectional view on line 7—7 of Fig. 2.

Fig. 8 is a detail view of the hinged joint showing a portion thereof in section to more clearly illustrate the details of construction.

Fig. 9 is a detail perspective view of the ratchet wheel by means of which the various parts are supported in adjusted position, the same wheel being used throughout where rotary adjustment is desired.

Fig. 10 is a side elevation through the drive sprocket of the saw.

Fig. 11 is a sectional view on line 11—11 of Fig. 10, and

Fig. 12 is a side view in elevation illustrating the yieldable brace rods for holding a saw frame extended, the lower end of said figure being partially in section to more clearly illustrate the details of construction.

Fig. 13 is a fragmentary plan view of the chain saw, and

Fig. 14 is an edge view of the chain saw showing a portion thereof in sections to more clearly illustrate the details of construction.

Referring to the drawings 1 designates the base of the device consisting of a suitable box like structure for containing the belt wheel and clutch which are supported on a suitable drive shaft 2 mounted in bearings 3. The pulley wheel is designated by the numeral 4 and a clutch 5 provided with a clutch lever 6 is arranged to control the movements of said shaft by the pulley wheel. Mounted on the end of the shaft is a bevel gear 7 which is adapted to mesh with and drive the bevel gear at the lower end of the vertical shaft which will be more fully hereinafter described.

Secured to the under side of the housing or casing 1 is a suitable hollow standard 8 provided at its base with a flange 9 by means of which it is secured in place and the upper end of this standard has rotatably mounted thereon a suitable sleeve 10 having fitted in its upper end the hollow stem 11 of the head 12 which will be more fully hereinafter described. The lower end of the stem 11 rests on the upper end of the standard 8 which extends well up into the sleeve 10 and it will thus be seen that the sleeve and head will be rotatably supported on the standard. A suitable clamp band 13 surrounds the upper end of the sleeve 10 and serves as a clamp to cause the sleeve to frictionally engage the stem 11 to prevent relative turning movement. Secured to the upper end of the standard 8 is a suitable ratchet wheel which is best illustrated in Fig. 9 and is designated by the numeral 14. This ratchet wheel 14 comprises a hub section 15 having formed integrally therewith the rim or flange 16. Extending laterally from the opposite terminals of the hub section 15 are suitable outwardly extending flanges 17 provided with apertures 18 for the reception of bolts by means of which the coöperating hub section is secured in place. An annular series of apertures 19 is formed intermediate the hub portion and the periphery of the flange 16 and form means to receive the latch pin which will be more fully hereinafter described. The coöperating hub section is designated by the numeral 20 and is provided at opposite terminals with laterally extending flanges 21 which are apertured as at 22 and this coöperating hub portion is adapted to coöperate with the hub portion 15 in completing the hub of the wheel. A lug 23 is formed centrally of the hub portion 20 and is adapted to enter an opening formed in the standard 8 formed immediately beneath the lower end of the sleeve 10.

A band 24 surrounds the lower end of the sleeve and has extending radially therefrom an arm 25 provided at its outer end with a downwardly extending arm 26 which in turn is formed with the finger 27 and with a guide hook 28. The finger and guide hook are provided with alining apertures for the reception of the latch pin 29 which is surrounded by a spring 30 arranged intermediate the finger and hook and this spring normally tends to move the pin inwardly toward the arm 25 as will be clearly seen upon reference to Fig. 1. As shown it will be seen that the pin will enter the openings 19 and thus hold the sleeve and standard against relative rotation in order to secure the device in the proper position. In order to release and retain the latch in released position, a return portion or top pin 31 is formed at the extreme outer end of the pin 29 and it will be seen that when the pin is withdrawn, the top pin may be turned to engage the outer side of the hook 28 and thus hold the pin 29 out of the opening. Loosely surrounding the upper end of the sleeve 10 is a ring or band 32 having connected thereto suitable stay rods 33 which are connected at their opposite ends to suitable ears 34 supported on the base 1.

The detail construction of the head 12 is best illustrated in Fig. 3 and each of said heads comprises the stem 11 having formed at its upper end a flange 35 which is circular and provided at its periphery with a flange 36 which is provided with the tangential extensions 37 one of which is apertured as at 38 while the other is provided with a pin 39. The pins 38 and apertures 39 are arranged so that they are in a plane with the part where the gears mesh so that the arm and standard may be swung without throwing the gears out of mesh. The upper end of the standard supports the arm designated generally by the numeral 40 which comprises the main body 8ª which is surrounded at one end by a sleeve 10ª formed with the head 12 and the opposite end of the arm is provided with the head 12ª to which the downwardly extending arm designated generally by the numeral 41 which is constructed in a manner similar to the arm 40 and supports at its lower end the saw frame designated generally by the numeral 42. Relative adjustment is obtained between the body 8ª and the sleeve 10ª by the ratchet wheel designated by the numeral 14ª and the spring pressed pin 29ª.

In order to hold the arm 40 in various adjusted positions a suitable band 43 is clamped above the sleeve 10 and has pivoted thereto an arm 44 which is surrounded by a spring 45. A suitable band 46 is clamped about the sleeve 10ª and is formed with a suitable guide 47 through which the rod 44 operates. The rod 44 is provided with suitable apertures for the reception of the latch pin 48 which is operable through one wall of the guide and through the hook 49 and this latch pin is normally urged into engagement with the rod by means of a spring 50 and it will be understood that when it is desired to hold the pin out of engagement with the rod the stop portion 51 formed at the outer end of said pin may be turned so as to engage the outer side of the hook 49 thus holding the pin in a withdrawn position. It will be understood that when in this position the weight of the arm will be supported on the spring 44 which will to a certain extent counterbalance the weight and thus enable the operator to readily adjust the device.

A similar adjusting mechanism designated generally by the numeral 52 is provided between the arms 40 and 41 and it will thus be seen that the angular relation of said arms may be readily adjusted. This saw frame comprises a back 53 having connected at one end an arm 54 and the back 53 and arm 54 are connected by a rigid brace 55 in order to prevent relative movement. The point where the arms join is connected by a suitable bolt 56 on which is rotatably mounted an idler pulley through which the saw runs. Hingedly connected to the end of the back 53 opposite the end to which the arm 54 is connected, is the arm 57, which is hinged on the sleeves 58 surrounding the bolt 59 by means of which the parts are held together. A sleeve 60 forms a bearing on which the idler 61 runs over which the saw passes. The end of the arm 57 opposite that which is connected to the back 53 has extending therethrough a suitable shaft or bolt 62 supporting a roller or idler over which the saw passes. In order to keep the unprotected run of the saw tight and set to its fullest extent in order to obtain the best effect a suitable spring brace 63 is connected between the back 53 and the arm 57 and normally tends to spread the parts thus holding the exposed run of the saw in operative position.

The brace 63 hereinbefore referred to is best illustrated in Fig. 12 and comprises a strap bent to form the bight portion 64 and a pair of parallel arms 65 the free ends of which are bent inwardly as at 66 and provide the ears 67 which are riveted or otherwise rigidly connected to provide a stem. Mounted between the arms 65 near the end opposite the bight portion 64 is a plate 68 having a central aperture therein through which the inner end of the plunger rod 69 extends. A similar plate 70 is slidably mounted between the arms 65 and is provided with a central aperture for receiving the stem 69 and a nut 71 is threaded on said stem and forms an abutment against which the plate 70 bears. A compression coil spring 72 surrounds the stem or plunger rod 69 between the two plates which form abutments therefor and it will thus be seen that spring will normally tend to move the plates away from each other thereby causing the plunger to normally tend to move outwardly from its position within the device. A suitable eye 73 is formed at the outer end of the plunger and is connected to an ear 74 on the arm 57 while the stem 67 is apertured to receive a pin by means of which the device is pivotally connected to the ear 75 on the back member 53.

The saw back and arms are formed of a pair of angle bars consisting of a top plate 76 formed with the flanges 77 and the bottom plate 78 formed with the flanges 79. The edges of the plates and flanges are cut away to form recesses 80 and lugs 81 which intermesh to firmly lock the two elements against relative movement.

The saw comprises a plurality of links which consist of the outer links 82 and the intermediate links 83. The outer links 82 carry the cutting teeth 84 while the inner links carry the drag teeth 85. As shown in the drawings the teeth of the outer links are arranged in staggered relation and the intermediate drag teeth are arranged to clear the cut made by the saw of any sawdust. This link or chain saw is mounted upon the idlers within the saw frame and passes over a driving sprocket which will be more fully hereinafter described.

The driving sprocket is designated generally by the numeral 86 and comprises a sprocket wheel 87 having attached to its opposite faces adjacent its rim a pair of rings 88 which form spaces to hold the flanges 89 in spaced relation to the sprocket. These flanges 89 are provided with inwardly extending fingers 90 which are secured to the sprocket and are arranged to hold the inner edge of the flange spaced from the outer edge of the sprocket wheel in order to prevent the accumulation of sawdust between the teeth.

It will be apparent from the foregoing that in use suitable drive shafts are arranged within the standard, the horizontal arm and the vertical arm and these drive shafts are provided at their adjacent ends with meshing bevel gears 91, the engaging teeth of which are curved as shown in order to allow the arm to be swung on its pivot without disengaging the teeth. The lower end of the shaft in the standard carries the bevel gear 92 which meshes with the bevel gear 7 while the lower end of the shaft in the arm 41 carries the sprocket wheel 86 and is journaled in a socket 93 secured to the under side of the saw frame. When the drive shaft 12 is operated it will be seen that power will be transmitted through the gears 7 and 92 to the vertical shaft within the standard and thence through the gears 91 through the horizontal shaft within the arm 40 and thence through the gears 91 at the opposite end of said shaft to the vertical shaft within the arm 41 which in turn will drive the sprocket thereby setting the saw in motion. It will be evident that by withdrawing any of the pins various adjustments of the saw may be had and upon releasing the pins it will be evident that the saw will remain in its adjusted position.

While in the foregoing there has been shown and described the preferred embodiment of this invention, it is to be understood that such changes may be made in the combination and arrangement of parts as will fall within the spirit and scope of the invention as claimed.

What is claimed is:—

1. In a saw of the class described, a saw frame comprising a back, an arm extending angularly from one end of the back, a pivoted arm connected to the opposite end of the back, a saw passing through each of the arms, guide pulleys at the points where the arms join the back for guiding the saw, a guide pulley at the free end of the pivoted arm, a drive sprocket at the free end of the rigid arm, a chain saw passing over said sprocket and pulleys and having one run exposed and means for tending to move the arms apart to keep the exposed run of the saw taut.

2. In a saw of the class described, a saw frame comprising a back, an arm extending angularly from one end of the back, a pivoted arm connected to the opposite end of the back, an idler pulley journaled at the point of connection of each arm with the back and in the free end of each arm, an endless chain saw arranged over the idler pulleys, a drive sprocket at the free end of the first arm, and spring means for normally urging the arms apart to tension the exposed run of the saw.

In testimony whereof I affix my signature in presence of two witnesses.

FLETCHER J. SCOTT.

Witnesses:
    VESS DELANEY,
    B. F. HOLMAN.